US012607151B2

(12) United States Patent
Nix et al.

(10) Patent No.: US 12,607,151 B2
(45) Date of Patent: Apr. 21, 2026

(54) SYSTEM AND METHOD FOR INJECTING CONDENSATE IN CYLINDER OF A RECIPROCATING ENGINE

(71) Applicant: INNIO Jenbacher GmbH & Co OG, Jenbach (AT)

(72) Inventors: Lorne Eugene Nix, Waukesha, WI (US); Michael Url, Neufahrn (DE); Wolfgang Fimml, Maurach in Tirol (AT)

(73) Assignee: Innio Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 18/437,235

(22) Filed: Feb. 8, 2024

(65) Prior Publication Data

US 2025/0257698 A1 Aug. 14, 2025

(51) Int. Cl.
*F02D 19/12* (2006.01)
*F02B 75/18* (2006.01)
(Continued)

(52) U.S. Cl.
CPC .............. *F02D 19/12* (2013.01); *F02B 75/18* (2013.01); *F02D 41/005* (2013.01);
(Continued)

(58) Field of Classification Search
CPC ...... F02D 1/12; F02D 41/005; F02D 41/1446; F02D 41/0077; F02D 41/0072; F02B 75/18; F02B 2075/1816; F02M 25/0222; F02M 25/0224; F02M 25/0227; F02M 25/03; F02M 25/0228; F02M 25/025;
(Continued)

(56) References Cited

U.S. PATENT DOCUMENTS 8,015,809 B2 9/2011 Watson
8,941,092 B2 1/2015 Mizuno
(Continued)

FOREIGN PATENT DOCUMENTS

DE 102012207907 A1 11/2013
EP 2789839 B1 10/2014

OTHER PUBLICATIONS

Gerald M. Rassweiler et al., "Motion Pictures of Engine Flames Correlated with Pressure Cards 380139", Jan. 1, 1938.
(Continued)

*Primary Examiner* — Dapinder Singh
(74) *Attorney, Agent, or Firm* — Fletcher Yoder, P.C.

(57) ABSTRACT

A system includes a condensate injection system configured to fluidly couple to a combustion chamber of a reciprocating engine and an exhaust gas recirculation (EGR) system of the reciprocating engine. The condensate injection system includes a condensate tank configured to store condensate collected from the EGR system. The condensate injection system also includes a pump fluidly coupled to the condensate tank. The condensate injection system also includes an injector fluidly coupled to the pump. The injector is configured to inject condensate into the combustion chamber during a first portion of an engine cycle of the reciprocating engine. The first portion of the engine cycle includes at least part of a power stroke and/or an exhaust stroke of the engine cycle.

20 Claims, 5 Drawing Sheets

(51) Int. Cl.

| | |
|---|---|
| ***F02D 41/00*** | (2006.01) |
| ***F02D 41/14*** | (2006.01) |
| ***F02M 25/022*** | (2006.01) |
| ***F02M 25/03*** | (2006.01) |
| ***F02M 26/22*** | (2016.01) |
| ***F02M 26/35*** | (2016.01) |

(52) U.S. Cl.
CPC ..... *F02D 41/1446* (2013.01); *F02M 25/0222* (2013.01); *F02M 25/0224* (2013.01); *F02M 25/0227* (2013.01); *F02M 25/03* (2013.01); *F02M 26/22* (2016.02); *F02M 26/35* (2016.02); *F02B 2075/1816* (2013.01)

(58) Field of Classification Search
CPC .. F02M 25/0221; F02M 25/028; F02M 26/22; F02M 26/35; F01N 9/00; F01N 11/00; Y02T 10/12; Y02T 10/40
See application file for complete search history.

(56) References Cited

U.S. PATENT DOCUMENTS

| | | | | |
|---|---|---|---|---|
| 10,024,268 | B2 * | 7/2018 | Kim | F02F 1/10 |
| 2005/0019578 | A1 * | 1/2005 | Bosteels | F01N 3/035<br>428/323 |
| 2014/0116374 | A1 * | 5/2014 | Brown | F02M 25/03<br>60/599 |
| 2014/0116404 | A1 * | 5/2014 | Piper | F02M 26/24<br>123/568.12 |
| 2015/0354437 | A1 * | 12/2015 | Mulye | F02M 26/22<br>123/25 C |
| 2016/0032870 | A1 * | 2/2016 | Nishida | F02M 25/028<br>123/25 C |
| 2018/0023522 | A1 * | 1/2018 | Styles | F02M 25/028<br>123/559.1 |

OTHER PUBLICATIONS

Technical University of Munich, Munich, Germany, "Performance potential of hydrogen combustion engines for industrial applications", Springer Link, Sep. 9, 2022.

* cited by examiner

SYSTEM AND METHOD FOR INJECTING CONDENSATE IN CYLINDER OF A RECIPROCATING ENGINE

BACKGROUND

The subject matter disclosed herein relates to reciprocating engines and associated heat exchangers.

A combustion system may include an exhaust gas recirculation (EGR) system configured to recirculate exhaust gas from an exhaust to an intake of a reciprocating engine. The EGR system may produce condensate due to a cooling of the exhaust gas via a set of heat exchangers. The condensate is expelled via a drainage system from the combustion system, such that the condensate is a byproduct of operating the combustion system. Accordingly, a need exists to reduce the amount of condensate outputted via a drainage system.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In certain embodiments, a system includes a condensate injection system configured to fluidly couple to a combustion chamber of a reciprocating engine and an exhaust gas recirculation (EGR) system of the reciprocating engine. The condensate injection system includes a condensate tank configured to store condensate collected from the EGR system. The condensate injection system also includes a pump fluidly coupled to the condensate tank. The condensate injection system also includes an injector fluidly coupled to the pump. The injector is configured to inject condensate into the combustion chamber during a first portion of an engine cycle of the reciprocating engine. The first portion of the engine cycle includes at least part of a power stroke and/or an exhaust stroke of the engine cycle.

In certain embodiments, a system includes a controller having a processor, a memory, and instructions stored on the memory and executable by the processor to control a condensate injection system configured to fluidly couple to a combustion chamber of a reciprocating engine and an exhaust gas recirculation (EGR) system of the reciprocating engine. The condensate injection system includes a condensate tank configured to store condensate collected from the EGR system. The condensate injection system also includes a pump fluidly coupled to the condensate tank. The condensate injection system also includes an injector fluidly coupled to the pump. The controller is configured to control the injector to inject condensate into the combustion chamber during a first portion of an engine cycle of the reciprocating engine. The first portion of the engine cycle includes at least part of a power stroke and/or an exhaust stroke of the engine cycle.

In certain embodiments, a method includes controlling, via a controller, a condensate injection system configured to fluidly couple to a combustion chamber of a reciprocating engine and an exhaust gas recirculation (EGR) system of the reciprocating engine. The condensate injection system includes a condensate tank configured to store a condensate collected from the EGR system. The condensate injection system also includes a pump fluidly coupled to the condensate tank. The condensate injection system also includes an injector fluidly coupled to the pump. Controlling includes commanding the injector to inject the condensate into the combustion chamber during a first portion of an engine cycle of the reciprocating engine. The first portion of the engine cycle includes at least part of a power stroke and/or an exhaust stroke of the engine cycle.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
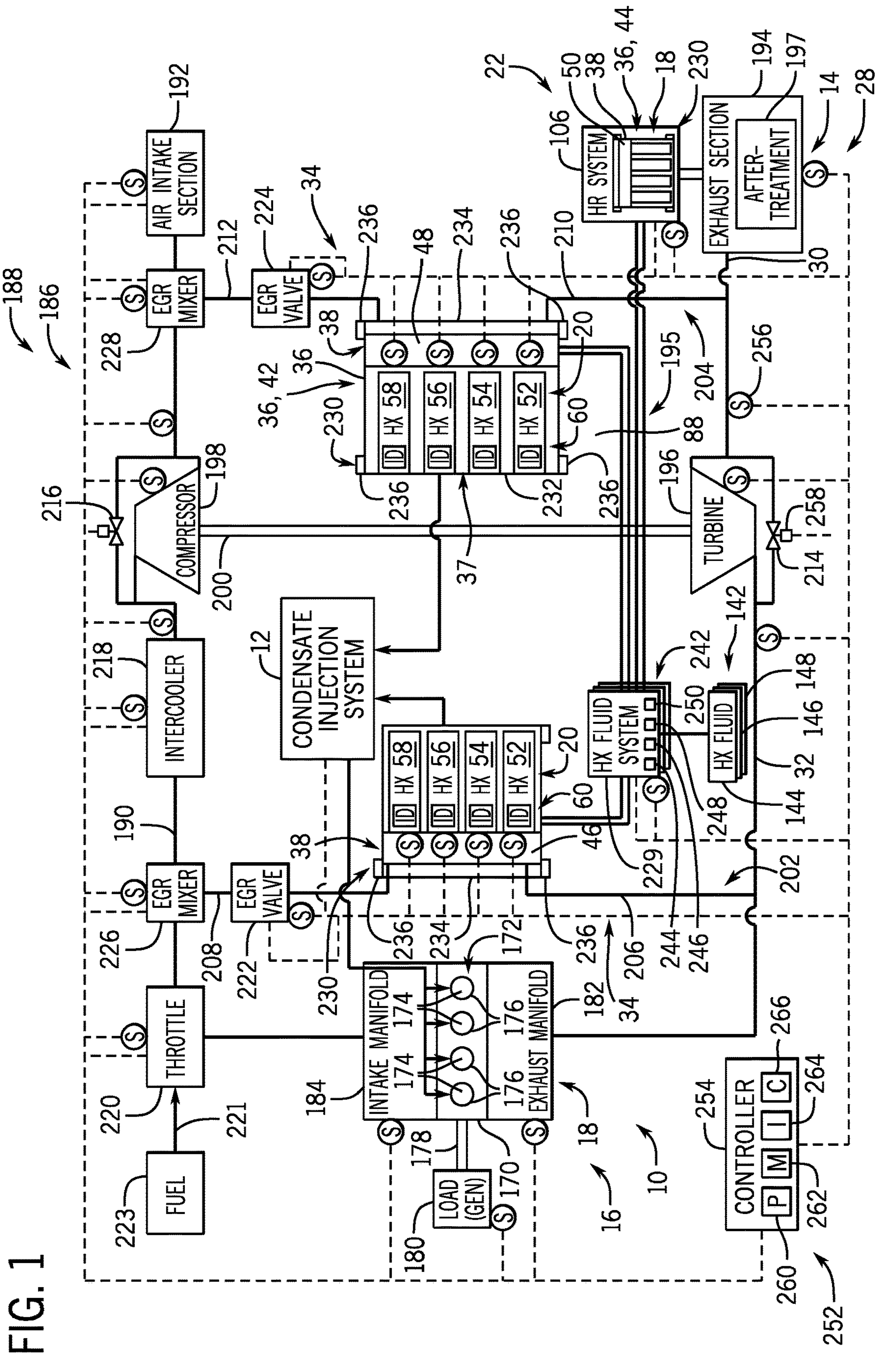
FIG. 1 is a diagram of an embodiment of a combustion system having a condensate injection system coupled to a recirculation line of an engine system.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles “a,” “an,” “the,” and “said” are intended to mean that there are one or more of the elements. The terms “comprising,” “including,” and “having” are intended to be inclusive and mean that there may be additional elements other than the listed elements.

The disclosed embodiments provide systems and methods for injecting condensate (e.g., water condensed from water vapor in the exhaust gas) collected from a heat exchanger assembly (e.g., exhaust cooling system, EGR cooler system) into a combustion chamber of a piston-cylinder assembly of a reciprocating engine, via a condensate injection system, during a portion of the engine cycle of the reciprocating engine. In particular, the portion of the engine cycle may include an end portion of a power stroke (e.g., combustion stroke) and an exhaust stroke of the engine cycle. Additionally, a controller may be configured to control the condensate injection system based on one or more signals received from one or more sensors disposed throughout the combustion system.

For example, the controller may be configured to monitor a temperature of an exhaust gas disposed in an exhaust system of the combustion system. If the temperature of the exhaust gas decreases below a lower temperature threshold or increases above a higher temperature threshold, then the controller may be configured to decrease or increase the amount of condensate into the combustion chamber, respectively. By controlling the amount of condensate injected into the combustion cylinder based on the exhaust temperature, the controller may be configured to regulate the temperature of the exhaust gas between the lower and higher temperature thresholds. Furthermore, the controller may be configured to monitor an amount of condensate stored in a condensate tank of the condensate injection system. In particular, the controller may be configured to control the amount of condensate injected into the combustion chamber and/or the amount of condensate produced by the heat exchanger assembly based on the monitored amount of condensate in the condensate tank. For example, the controller may be configured to increase the consumption of condensate (e.g., via injection) and/or decrease the production of condensate in response to the amount of condensate in the condensate tank exceeding a high threshold. Additionally or alternatively, the controller may be configured to decrease the consumption of condensate (e.g., via injection) and/or increase the production of condensate in response to the amount of condensate in the condensate tank falling below a low threshold. Furthermore, the controller may be configured to monitor one or more parameters of the reciprocating engine for determining when to inject the condensate into the combustion chamber. For example, the controller may be configured to utilize one or more maps (e.g., lookup tables of various parameters) of the combustion system to determine one or more parameters that are not measured directly (e.g., internal pressure of the combustion chamber). The controller may be configured to determine a crank angle corresponding to a starting point and/or end point of the engine cycle for condensate injection based on the one or more parameters determined via the maps.

FIG. 1 is a diagram of an embodiment of a combustion system 10 having a condensate injection system 12 coupled to a recirculation line 14 of an engine system 16. The engine system 16 may include a reciprocating engine 18 having a heat exchange system 20 (e.g., EGR cooling system) and an exhaust system 22. As discussed below, the condensate injection system 12 is configured to receive condensate (e.g., water condensed from water vapor in exhaust gas 30) from the heat exchange system 20, store the water in one or more condensate tanks, and supply the condensate to combustion chambers of the reciprocating engine 18 during an end portion of a power stroke and/or an exhaust stroke. Thus, the condensate injection system 12 is configured to control a temperature in the combustion chamber and the discharging exhaust gas 30, while also reducing or eliminating waste of the condensate. The temperature control may be used to help control exhaust emissions and protect downstream equipment (e.g., turbocharger, valves, etc.) from excessive temperatures in the exhaust gas 30. In certain embodiments, the condensate injection system 12 may rely only on the condensate for injection into the combustion chambers of the reciprocating engine 18 without any additional supply of water. However, in some embodiments, the condensate injection system 12 may supplement the condensate with a separate water supply for injection into the combustion chambers of the reciprocating engine 18. For example, the condensate injection system 12 may selectively supplement the condensate with the separate water supply when the condensate is insufficient to meet demands. Additional details of the condensate injection system 12 are discussed below.

The reciprocating engine 18 may include a four-stroke engine having a four-stroke cycle (e.g., intake stroke, compression stroke, power/expansion stroke, exhaust stroke). In certain embodiments, the reciprocating engine 18 may include a two-stroke engine or a five-stroke engine. The reciprocating engine 18 may also include any number of combustion chambers, pistons, and associated cylinders (e.g., 1-24) in one cylinder bank (e.g., inline) or multiple cylinder banks (e.g., left and right cylinder banks) of a V, W, VR (a.k.a. Vee-Inline), or WR cylinder bank configuration. For example, in certain embodiments, the reciprocating engine 18 may include a large-scale industrial reciprocating engine having 6, 8, 12, 16, 20, 24 or more pistons reciprocating in cylinders. In some such cases, the cylinders and/or the pistons may have a diameter of between approximately 13.5-31 centimeters (cm). In certain embodiments, the cylinders and/or the pistons may have a diameter outside of the above range. The fuel utilized by the reciprocating engine 18 may be any suitable gaseous fuel, such as natural gas, associated petroleum gas, hydrogen ($H_2$), propane ($C_3H_8$), biogas, sewage gas, landfill gas, coal mine gas, butane ($C_4H_{10}$), ammonia ($NH_3$) for example. The fuel may also include a variety of liquid fuels, such as gasoline, diesel, methanol, or ethanol fuel. The fuel may be admitted through either a high pressure (blow-through) fuel supply system or low pressure (draw-through) fuel supply system or direct injection. In certain embodiments, the fuel may be admitted via port fuel injection (PFI). In certain embodiments, the reciprocating engine 18 may utilize spark ignition. In other embodiments, the reciprocating engine 18 may utilize compression ignition.

The exhaust system 22 may include one or more exhaust circuits 28 between the reciprocating engine 18 and the corresponding heat exchange system 20. The exhaust circuits 28 may be configured to route one or more flows of exhaust gas 30 between the reciprocating engine 18 and the heat exchange system 20. For example, the reciprocating engine 18 may output and route a flow of the exhaust gas 30 along an exhaust line 32 to the heat exchange system 20 and recirculate the exhaust gas 30 from the heat exchange system 20 back into the reciprocating engine 18 via one or more exhaust gas recirculation (EGR) circuits 34.

The heat exchange system 20 coupled to the exhaust circuit 28 may include one or more heat exchanger assemblies 36, wherein each of the heat exchanger assemblies 36 includes a plurality of the heat exchanger modules 37 coupled to one of a plurality of distribution manifolds 38. For example, the heat exchanger assemblies 36 may include heat exchanger assemblies 40, 42, and 44, wherein each of the heat exchanger assemblies 36 includes one of the distribution manifolds 38 (e.g., distribution manifolds 46, 48, and 50). Each of the heat exchanger assemblies 36 may include any number of the heat exchanger modules 37 disposed in a series arrangement, a parallel arrangement, or a combination thereof. For example, in certain embodiments, the heat exchanger modules 37 for each of the heat exchanger assemblies 36 having one of the distribution manifolds 38 may include heat exchangers (e.g., EGR coolers) 52, 54, 56, and 58. Although four heat exchangers 52, 54, 56, and 58 are shown, any number of heat exchangers (e.g., up to an Nth heat exchanger) may be disposed in each of the heat exchanger assemblies 36. The heat exchangers 52, 54, 56, and 58 may be arranged in series, in parallel, or a combination thereof. In certain embodiments, the heat exchangers 52 and 54 may be first stage heat exchangers (e.g., arranged in parallel), the heat exchanger 56 may be a second stage heat exchanger, and the heat exchanger 58 may be a third stage heat exchanger. However, the heat exchanger modules 37 may be arranged in any number of stages, each stage having 1, 2, 3, or more heat exchangers arranged in parallel with one another.

The illustrated heat exchanger assemblies 40, 42, and 44 each have one of the distribution manifolds 46, 48, and 50 having a plurality of the heat exchanger modules 37, such as the heat exchangers 52, 54, 56, and 58. The heat exchanger assemblies 40, 42, and 44 may have the same or different configuration of the heat exchanger modules 37 and the distribution manifolds 38, such as the same or different numbers of the heat exchanger modules 37, the same or different numbers of sections making up the distribution manifolds 38, or any combination thereof. Each of the distribution manifolds 38 may represent a single one-piece distribution manifold (e.g., single cast manifold), a multi-piece distribution manifold (e.g., sectional cast manifold) having different manifold portions removably coupled together, or individual conduits coupling together the heat exchanger modules 37 as a multi-conduit distribution manifold.

In the illustrated embodiment, each heat exchanger assembly 36 includes a plurality of the heat exchanger modules 37, such as a series arrangement of the heat exchangers 52, 54, 56, and 58, coupled to at least one of the distribution manifolds 38. The heat exchanger modules 37 are also coupled to the exhaust line 32 and the EGR circuit 34 of the exhaust system 22 through the at least one distribution manifold 38. A flow of the exhaust gas 30 may be configured to flow from the reciprocating engine 18 through the exhaust line 32 into one of the distribution manifolds 38, through the heat exchanger modules 37, back through one of the distribution manifolds 38, and then through the EGR circuit 34 for recirculation into an intake of the reciprocating engine 18. In some embodiments, at least part or all of the exhaust gas 30 may not flow back into the reciprocating engine 18 via the EGR circuit 34. For example, at least part of the exhaust gas 30 may not enter the heat exchanger assembly 36 and flow downstream into one of the exhaust gas waste heat recovery systems 106 and/or discharge into the environment.

Each distribution manifold 38 may be configured to circulate the exhaust gas 30 from the reciprocating engine 18 through each of the heat exchanger modules 37, such as in a series arrangement and/or a parallel arrangement, while also circulating one or more heat exchange fluids 142 through the distribution manifold 38 and the heat exchanger modules 37. For example, the heat exchange fluids 142 may include heat exchange fluids 144, 146, and 148. The heat exchange fluids 142 may include one or more liquids, such as condensate, antifreeze liquids or additives, coolants, or any combination thereof. For example, the heat exchange fluids 142 may include a main engine fluid and an auxiliary fluid. For example, the main engine fluid may flow to, from, and through the reciprocating engine 18, such that the main engine fluid may be configured to provide cooling of the reciprocating engine 18. Similarly, the auxiliary fluid may pass to and from one or more auxiliary systems, such that the auxiliary fluid may provide cooling. The auxiliary systems may be related and/or unrelated to the reciprocating engine 18, but the auxiliary systems may be outside or separate from the reciprocating engine 18. For example, auxiliary systems may include other power plant equipment, and the auxiliary fluid may be described as a balance of plant (BoP) fluid (e.g., BoP auxiliary coolant)). Again, for each heat exchanger assembly 36, the distribution manifold 38 may be configured to route inputs and outputs of both the exhaust gas 30 and the heat exchange fluids 142 (e.g., the main engine fluid and/or the auxiliary fluid) through each of the heat exchanger modules 37.

Accordingly, the heat exchanger assemblies 36 may transfer heat between the exhaust gas 30 and one or more of the heat exchange fluids 142, such as the main engine fluid and the auxiliary fluid. The heat exchanger modules 37 may be gas liquid heat exchangers, which are configured to transfer heat between the exhaust gas 30 and the liquid of the heat exchange fluids 142. In some embodiments, each of the heat exchanger modules 37 may be a plate heat exchanger, a brazed plate heat exchanger, and/or a gas-to-liquid plate heat exchanger.

In the illustrated embodiment, the heat exchanger assemblies 36 are disposed in three different locations throughout the exhaust system 22, as indicated by heat exchanger assemblies 40, 42, and 44. However, the exhaust system 22 may include only one or two of the heat exchanger locations (e.g., heat exchanger assemblies 40, 42, and 44). The reciprocating engine 18 includes an engine block 170 having a plurality of piston-cylinder assemblies 172, each having a piston 174 disposed within a cylinder 176. Each piston 174 may be configured to reciprocate within the cylinder 176 in response to combustion in a combustion chamber of the engine block 170, thereby driving rotation of a crankshaft coupled to a shaft 178 driving a load 180 (e.g., an electric generator). Additionally, the reciprocating engine 18 includes an exhaust manifold 182 and an intake manifold 184. The intake manifold 184 is coupled to an intake circuit 186 of an intake system 188, while the exhaust manifold 182 is coupled to the exhaust circuit 28 of the exhaust system 22. The intake circuit 186 includes one or more intake lines 190 extending between an air intake section 192 and the intake manifold 184, thereby supplying air into the reciprocating engine 18. For example, the air intake section 192 may include an air intake duct, air filters, or other features to process the air coming into the intake system 188.

The exhaust system 22 has one or more exhaust lines 32 extending between an exhaust section 194 and the exhaust manifold 182. For example, the exhaust section 194 may include a silencer, an after-treatment 197 (e.g., three-way catalyst), a discharge duct, or other equipment to facilitate discharge of the exhaust gas into the environment. As noted above, the exhaust system 22 also may include one or more EGR circuits 34 (e.g., recirculation line 14) to facilitate exhaust gas recirculation between the exhaust circuit 28 and the intake circuit 186. For example, the EGR circuits 34 may include EGR lines 199 disposed upstream and/or downstream of a turbocharger 195, which includes a turbine 196 disposed along the exhaust line 32, a compressor 198 disposed along the intake line 190, and a shaft 200 coupling together the turbine 196 and the compressor 198. The turbocharger 195 is driven by exhaust gas passing through the exhaust line 32 and through the turbine 196, which in turn rotates the shaft 200 coupled to the compressor 198. The compressor 198 operates to compress an airflow from the air intake section 192 flowing along the intake line 190 into the intake manifold 184.

As noted above, the EGR circuits 34 may include EGR lines 199 both upstream and downstream of the turbocharger 195. For example, the EGR circuits 34 may include EGR circuits 202 and 204 disposed at different positions upstream and downstream relative to the turbocharger 195. In the illustrated embodiment, the EGR circuit 202 has EGR lines 206 and 208 coupled to the respective exhaust line 32 and the intake line 190, wherein the EGR lines 206 and 208 also couple to one of the heat exchanger assemblies 36 (e.g., the heat exchanger assembly 40). Similarly, the EGR circuit 204 has EGR lines 210 and 212 coupled to the respective exhaust line 32 and the intake line 190, wherein the EGR lines 210 and 212 also couple to one of the heat exchanger assemblies 36 (e.g., the heat exchanger assembly 42). In the illustrated embodiment, the EGR circuit 202 may be described as a high pressure EGR circuit, due to its location upstream from the turbine 196, whereas the EGR circuit 204 may be considered a low pressure EGR circuit based on its position downstream from the turbine 196. The exhaust system 22 may include one or more of the heat recovery systems, such as the exhaust gas waste heat recovery system 106 having one of the heat exchanger assemblies 36 (e.g., the heat exchanger assembly 44).

The combustion system 10 may include a variety of components along the exhaust system 22 and the intake system 188. As discussed above, the turbine 196 of the turbocharger 195 is disposed along the exhaust line 32 of the exhaust system 22. The turbocharger 195 also may include a bypass valve or waste gate valve 214 configured to open and close to vary a bypass of exhaust gas around the turbine 196. The exhaust section 194 also may include various components, such as the silencer, after-treatment 197, or other exhaust gas treatment components.

Similarly, the intake system 188 may include a bypass valve 216 configured to open and close to vary a bypass flow of air intake around the compressor 198. The intake circuit 186 of the intake system 188 may include an intercooler 218 configured to control the temperature of the air intake and a throttle 220 configured to control the flow of the air intake and fuel 221 from a fuel supply 223 into the intake manifold 184. For example, the intercooler 218 may be a heat exchanger configured to transfer heat away from the intake air after compression in the compressor 198, thereby cooling the compressed air to a suitable temperature prior to intake into the reciprocating engine 18 via the intake manifold 184. The throttle 220 also may be configured to control the fluid flows (e.g., air, recirculate exhaust gas, and fuel) into the intake manifold 184 downstream from the intercooler 218. The air intake section 192, as discussed above, may include air filters, intake ducts, or other equipment to properly intake and route the air flow into the reciprocating engine 18.

Each of the EGR circuits 202 and 204 may be configured to recirculate an exhaust gas 30 being discharged along the exhaust line 32 into the intake line 190 for return into the intake manifold 184 of the reciprocating engine 18. Each of the EGR circuits 202 and 204 includes an EGR valve, such as EGR valves 222 and 224, configured to regulate the flow of exhaust gas 30 back into the reciprocating engine 18 through the respective circuits 202 and 204. Downstream from the EGR valves, the EGR circuits 202 and 204 may include an EGR mixer, such as EGR mixers 226 and 228. The EGR mixers 226 and 228 are configured to mix the EGR flow (e.g., the exhaust gas) with the incoming air from the air intake section 192. The EGR mixers 226 and 228 mix the exhaust gas and air prior to delivery into the reciprocating engine 18 via the intake manifold 184. The EGR mixer 226 mixes the exhaust gas and air downstream from the compressor 198 of the turbocharger 195, whereas the EGR mixer 228 mixes the exhaust gas in the air upstream from the compressor 198 of the turbocharger 195.

In certain embodiments, the combustion system 10 may include only one or both of the EGR circuits 202 and 204 and the respective heat exchanger assemblies 36. Each of the heat exchanger assemblies 36, such as the heat exchanger assemblies 40 and 42, may be configured to transfer heat away from the exhaust gas 30 and into one or more heat exchange fluids 142 of a heat exchanger fluid system 229. For example, as discussed above, the heat exchange fluids 142 may include a main engine fluid and/or an auxiliary fluid. The heat exchanger assemblies 36 transfer heat away from the exhaust gas into the heat exchange fluids 142 of the heat exchanger fluid system 229, thereby cooling the exhaust gas prior to recirculating the exhaust gas back into the intake manifold 184 of the reciprocating engine 18. The heat exchanger fluid system 229 may include one or more components 242, such as components 244, 246, 248, and 250, such as fluid pumps, valves, filters, sensors, or any combination thereof. The heat exchanger assemblies 36 (e.g., heat exchanger assemblies 40 and 42) may be described as EGR cooling systems, such as multi-stage EGR cooling systems that provide EGR cooling in a plurality of stages.

As discussed above, each of the heat exchanger assemblies 36 (e.g., heat exchanger assemblies 40 and 42) includes a plurality of the heat exchanger modules 37, such as heat exchangers 52, 54, 56, and 58, disposed in series and/or parallel along the EGR circuit 202 or 204. The heat exchanger modules 37 are coupled to one of the distribution manifolds 38, which in turn couples with the EGR lines 206 and 208 of the EGR circuit 202 or the EGR lines 210 and 212 of the EGR circuit 204. In the EGR circuit 202, the EGR line 206 directs the exhaust gas from the exhaust line 32 into the manifold 38, while the EGR line 208 receives a discharge of the exhaust gas from the distribution manifold 38 and returns the exhaust gas into the intake line 190. The EGR circuit 204 has the EGR line 210 coupled to an intake of the distribution manifold 38, while the EGR line 212 couples to a discharge of the distribution manifold 38 and returns the exhaust gas to the intake line 190. Similarly, the exhaust gas waste heat recovery system 106 has one of the heat exchanger assemblies 36 (e.g., heat exchanger assembly 44) coupled to the exhaust section 194 to facilitate waste heat recovery using the heat exchanger modules 37. The heat exchanger assembly 44 of the exhaust gas waste heat recovery system 106 may include any number of the heat exchanger modules 37 in series, in parallel, or a combination thereof, in a similar manner as the heat exchanger modules 37 in the EGR circuits 202 and 204.

In each of the heat exchanger assemblies 36, the manifold 38 and the heat exchanger modules 37 may be coupled together and supported by a support system 230. For example, the support system 230 may include a horizontal support, slab or table 232, a vertical support or backrest 234, and a plurality of legs 236. The horizontal support 232 may be configured to support the heat exchanger modules 37, the vertical support 234 may be configured to support the distribution manifold 38, and the legs 236 are coupled to the horizontal support 232 and extend to the ground to support the entire support system 230 at a vertical distance above the ground. However, a variety of support systems 230 may be used to support each of the heat exchanger assemblies 36.

In certain embodiments, the combustion system 10 may include a control system 252 having a controller 254 coupled to a plurality of sensors 256 and actuators 258 distributed about the combustion system 10. For example, the sensors 256, designated as "S," may be coupled to the combustion system 10 at various locations along the exhaust system 22, the intake system 188, the EGR circuit 202, the EGR circuit 204, the turbocharger 195, the reciprocating engine 18, and the heat exchanger assemblies 36. Each of these sensors 256 may be configured to obtain feedback associated with one or more parameters of an exhaust gas in the exhaust system 22. For example, the sensors 256 may be used to monitor a temperature of the exhaust gas output via the exhaust system 22. Additionally or alternatively, the sensors 256 may be configured to monitor a parameter indicative of an amount of emissions (e.g., emission gases) in the exhaust gas output via the exhaust system 22. The actuators 258 may include valve actuators, such as valve actuators for the waste gate 214 and the bypass valve 216, pump actuators for the heat exchanger fluid system 229, valve actuators for the EGR valves 222 and 224, or any combination thereof.

The sensors 256 monitor and, in certain embodiments, retain in memory the parameters along with other information associated with the exhaust system 22. The sensors 256 may include physical sensors and/or virtual sensors, which are configured to measure certain parameters based on input data. The monitored parameters may include a temperature, a pressure, a flow rate, a leakage, a composition of the fluid, a vibration, a time, reciprocating engine metrics, or any combination thereof.

The parameters monitored by the sensors 256 may be further characterized as set forth below. At least some or all of the monitored parameters may correspond to a measured temperature, a measured pressure, a measured flowrate, or a combination thereof of the exhaust gas passing through the exhaust system 22. The measured temperature may include an exhaust gas temperature, a main fluid temperature, and/or an auxiliary fluid temperature, wherein the respective temperatures may include temperatures measured at the inlets and the outlets and changes in temperatures between the inlets and the outlets of the exhaust system 22. For exhaust gas temperatures, the exhaust gas temperatures may include EGR exhaust gas temperatures, heat recovery (HR) exhaust gas temperatures (e.g., in the exhaust gas waste heat recovery system 106), or any combination thereof. Similarly, the measured pressure may include an exhaust gas pressure, a main fluid pressure, and/or an auxiliary fluid pressure, wherein the respective pressures may include pressures measured at the inlets and the outlets and changes in pressures between the inlets and the outlets (e.g., pressure drops) of the exhaust gas system 22. Similarly, the measured flow rate may include an exhaust gas flow rate, a main fluid flow rate, and/or an auxiliary fluid flow rate, wherein the respective flow rates may include flow rates measured at the inlets and the outlets and changes in flow rates between the inlets and the outlets of the exhaust system 22.

In certain embodiments, the sensors 256 may be configured to monitor a measured composition of the exhaust gas passing through the exhaust system 22. For example, the measured composition of the exhaust gas may include a humidity or condensate content in the exhaust gas, a particulate or soot content in the exhaust gas, a carbon dioxide ($CO_2$) content in the exhaust gas, an oxygen ($O_2$) content in the exhaust gas, a nitrogen oxide (NOx) content in the exhaust gas, a sulfur oxide (SOx) content in the exhaust gas, or any combination thereof.

In certain embodiments, the controller 254 may include a processor 260, a memory 262, instructions 264 stored on the memory and executable by the processor, and communication circuitry 266 configured to communicate with the sensors distributed throughout the combustion system 10. As discussed herein, the controller 254 may be configured to control the condensate injection system 12 to inject the condensate, via an injector, into each combustion chamber 292 (see FIG. 2) of the reciprocating engine 18 during a portion of the engine cycle of the reciprocating engine 18. In certain embodiments, the controller 254 may be configured to control the condensate injection system 12 in response to the feedback received from the sensors 256. The controller 254 may use local and/or remote computer systems and storage, web-based interfaces, cloud-based interface, apps on smart devices (e.g., smart phones, tablet computers, etc.), or any suitable use interface. In certain embodiment, the controller 254 may implement a cloud-based platform used for asset management of the reciprocating engines 18, such as myPlant, provided by Innio of Jenbach, Tyrol, Austria.

Figure 2:
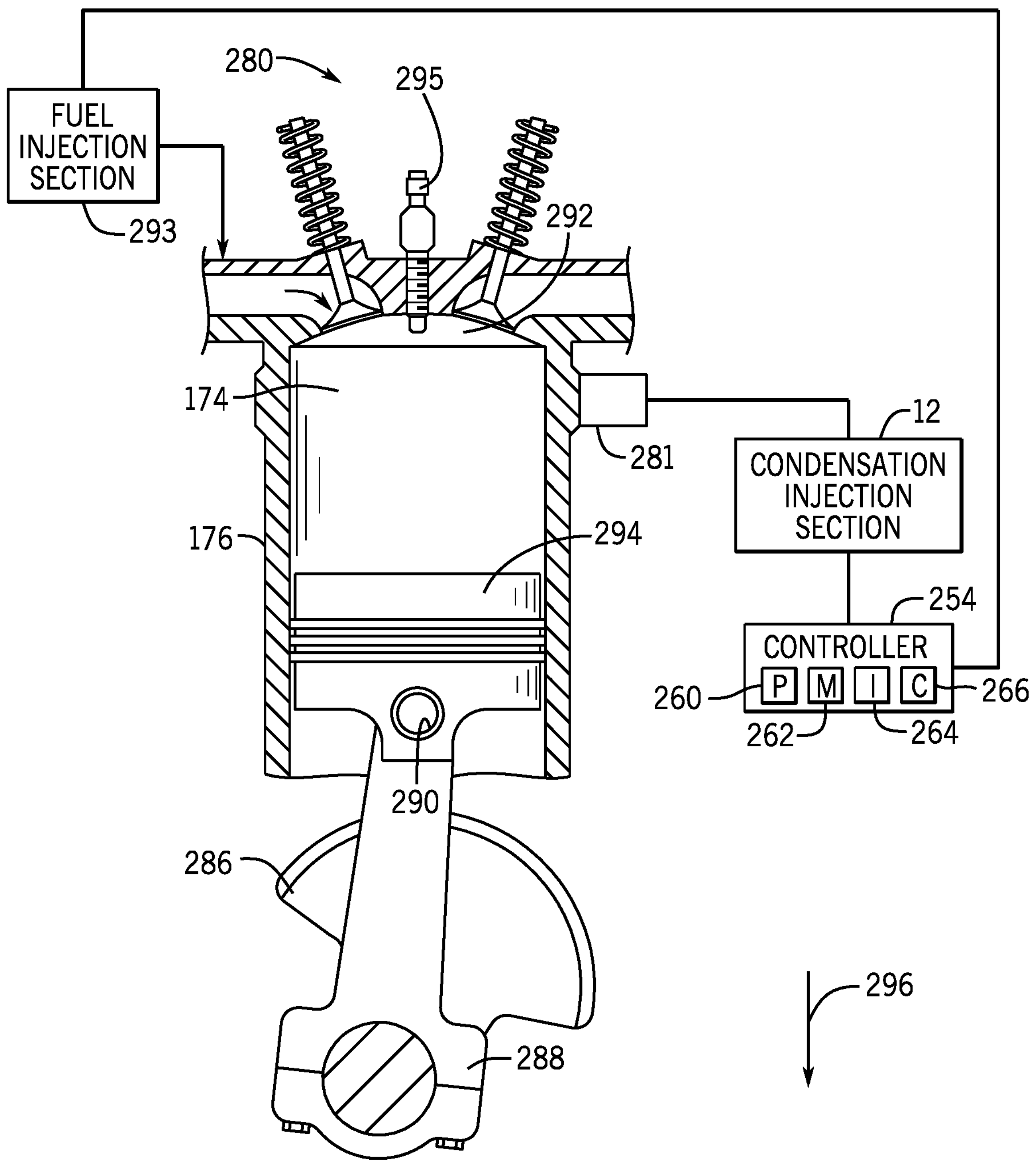
FIG. 2 is a schematic view of an embodiment of a piston-cylinder assembly having an injector coupled to the condensate injection system.

FIG. 2 is a schematic view of an embodiment of a piston-cylinder assembly 280 having an injector(s) 281 coupled to the condensate injection system 12. In certain embodiments, the injector(s) 281 may include direct injectors that may use wall-guided direction injection, air-guided direct injection, spray-guided direct injection, or a combination thereof. As shown, the piston-cylinder assembly 280 includes a piston 174 disposed within a cylinder 176 (e.g., an engine cylinder) of the engine system. The piston 174 is attached to a crankshaft 286 via a connecting rod 288 and a pin 290. The crankshaft 286 converts the reciprocating linear motion of the piston 174 into a rotating motion. As the piston 174 moves, the crankshaft 286 rotates to power the load 180 (shown in FIG. 1), as discussed herein. As shown, a combustion chamber 292 is positioned adjacent to the top land 294 of the piston 174. The condensate injection system 12 injects condensate into the combustion chamber 292 via the injector(s) 281. In certain embodiments, the injector(s) 281 may additionally inject fuel into the combustion chamber 292 of the piston 174. Alternatively, one injector(s) 281 may be used for the injection of fuel into the combustion chamber 292 and a separate injector(s) 281 may be used for the injection of condensate into the combustion chamber 292. In certain embodiments, a separate fuel injection system 293 may inject fuel into the combustion chamber 292 via fuel injector(s) 295. As shown, the fuel injection system 293 may be controlled via the controller 254. In operation, combustion of the fuel with the air in the combustion chamber 292 cause the piston 174 to move in a reciprocating manner (e.g., back and forth) in the axial direction 296 within the cylinder 176. During operations, when the piston 174 is at the highest point in the cylinder 176, it is in a position called top dead center (TDC). When the piston 174 is at its lowest point in the cylinder 176, it is in a position called bottom dead center (BDC). For a four-stroke engine, the piston 174 is positioned at TDC twice during the four-stroke cycle, and is positioned at BDC twice during the four-stroke cycle. The two TDC positions include top dead center firing (TDCF), and top dead center gas exchange (TDCGE) or top dead center exchange (or alternatively, TDCE). As the piston 174 moves from top to bottom or from bottom to top, the crankshaft 286 rotates one half of a revolution. Each movement of the piston 174 from top to bottom or from bottom to top is called a stroke.

As shown, the controller 254 is communicatively coupled to the condensate injection system 12 and configured to control the condensate injection system 12, which is coupled to the injector(s) 281. The controller 254 may be configured to control the condensate injection system 12 to inject the condensate, via the injector(s) 281, into a combustion chamber 292 of the reciprocating engine 18 during a portion of the engine cycle of the reciprocating engine 18. The portion of the engine cycle is described in further detail herein.

Figure 3:
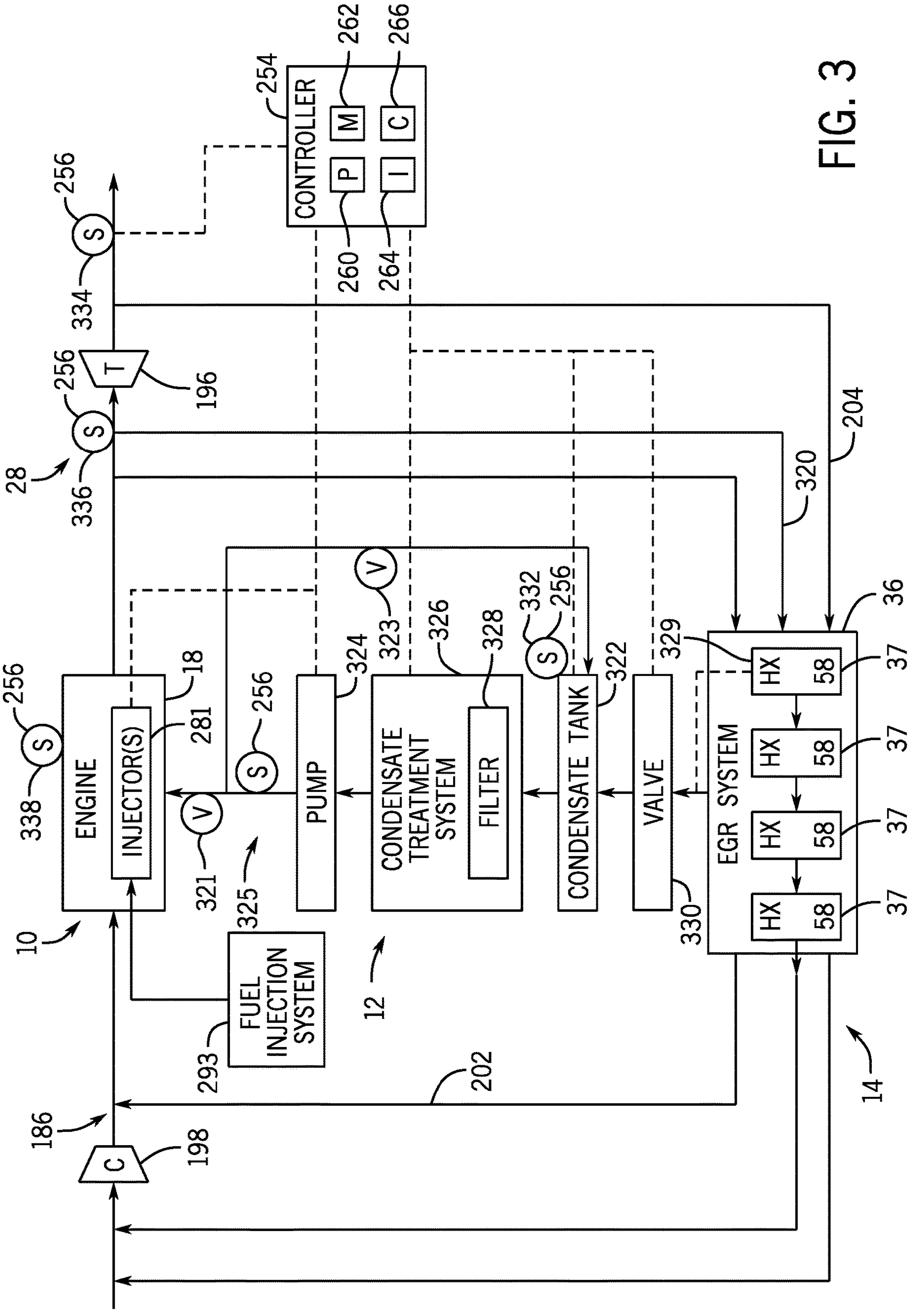
FIG. 3 is a diagram of an embodiment of the combustion system of FIG. 1, further illustrating the condensate injection system coupled to the recirculation line and a reciprocating engine of the combustion system.

FIG. 3 is a diagram of an embodiment of the combustion system 10 of FIG. 1, further illustrating the condensate injection system 12 coupled to the recirculation line 14 (e.g., EGR circuits 202, 204, and 320) and the reciprocating engine 18 of the combustion system 10. As shown, the condensate injection system 12 includes a condensate tank 322 configured to collect and store condensate from the recirculation line 14. The condensate injection system 12 also includes a pump 324 (e.g., electric motor driven pump) coupled to the condensate tank 322. In certain embodiments, the condensate injection system 12 may include a condensate treatment system 326 disposed between the condensate tank 322 and the pump 324 and, in certain embodiments, the condensate treatment system 326 may have one or more filters 328. For example, the filters 328 may include a media filter, a centrifugal separator, a gravity separator, or any combination thereof. The condensate treatment system 326 also may include other treatment systems, such as a biological treatment system (e.g., an ultraviolet light treatment system). In certain embodiments, the condensate treatment system 326 includes a reverse osmosis (RO) system, a deionized (DI) system, a distilled water system, and/or a pH balancing/neutralizer system. The condensate injection system 12 also includes one or more injectors 281 coupled to one or more cylinders and fluidly coupled to the pump 324 of the reciprocating engine 18, and configured to inject condensate (e.g., and fuel) into one or more combustion chambers during a portion of the engine cycle of the reciprocating engine 18. In certain embodiments, each injector 281 may include a common injection flow path for selectively injecting the condensate and the fuel at different times, or separate injection flow paths (e.g., coaxial or parallel offset flow paths) for separately injecting the condensate and the fuel at the different times. Each injector 281 may include one or more fluid injection orifices, nozzles, or atomizers to inject a spray (e.g., atomized spray) of the condensate or the fuel. In certain embodiments, the fuel may be injected into the reciprocating engine 18 via the fuel injection system 293. In certain embodiments, the condensate injection system 12 may include a check valve 321 disposed between the pump 324 and the injector(s) 281 to prevent backflow should the injector(s) open when cylinder pressure exceeds condensate pump pressure. In certain embodiments, the condensate injection system 12 may include a pressure relief valve 323, back to the condensate tank, as a way to mitigate excess pressure in the condensate fluid circuit 325 in the event that the injector(s) 281 fail to open.

For the condensate injection via the injector 282, the portion of the engine cycle includes at least part of a combustion stroke (e.g., power stroke) and/or an exhaust stroke of the engine cycle. In certain embodiments, the combustion stroke spans from TDCF to 180 degrees after TDCF (e.g., aTDCF). Additionally, in certain embodiments, the exhaust stroke spans from 180 degrees aTDCF to TDCGE (or alternatively, TDCE).

As shown, the recirculation line 14 may include the heat exchanger assembly 36 (e.g., exhaust cooling system or EGR cooler system) having heat exchanger modules 37 (e.g., heat exchangers 52, 54, 56, and 58) configured to cool the exhaust gas 30. In certain embodiments, the condensate tank 322 may be coupled to one or more of the heat exchanger modules 37 (e.g., condensing heat exchangers), wherein the heat exchanger modules 37 are configured to condense water vapor in the exhaust gas 30 and discharge condensate to the condensate tank 322. In certain embodiments, the heat exchanger modules 37 of the heat exchanger assembly 36 may include one or more non-condensing heat exchangers, one or more condensing heat exchangers, and/or one or more reheat heat exchangers arranged in a sequence (e.g., multiple stages). For example, heat exchangers 52 and 54 may be non-condensing heat exchangers (e.g., first EGR cooler stage), the heat exchanger 56 may be a condensing heat exchanger, and the heat exchanger 58 may be a reheat heat exchanger. However, any arrangement of non-condensing, condensing, and/or reheat heat exchanger modules 37 may be used for the heat exchangers 52, 54, 56, and 58. In certain embodiments, the condensate tank 322 may be coupled to the one or more condensing heat exchangers via an outlet (e.g., condensate drain conduit 329) disposed in each of the condensing heat exchangers. Additionally or alternatively, a valve 330 may be disposed between the heat exchanger assembly 36 and the condensate tank 322 and configured to regulate the amount of condensate collected in the condensate tank 322. Collectively a condensate fluid circuit (e.g., condensate flow path) 325 extends from the heat exchanger assembly 36 to the injectors 281 of the reciprocating engine 18, wherein the condensate fluid circuit 325 includes the valve 330, the condensate tank 322, the condensate treatment system 326, the pump 324, and various connecting fluid conduits. Although the illustrated embodiment shows condensate being collected from the heat exchanger assembly 36, it should be understood that the condensate may be additionally or alternatively collected from other locations, including the waste heat recovery system 106 shown in FIG. 1.

As discussed herein, the heat exchanger assembly 36 may be coupled to the reciprocating engine 18. For example, the heat exchanger assembly 36 may be coupled to the intake circuit 186 and the exhaust circuit 28. As shown, the recirculation line 14 may include EGR circuits 202, 204, or 320. As discussed herein, the EGR circuit 202 may couple to the intake circuit 186 downstream of the compressor 198 and may also couple to the exhaust circuit 28 upstream of the turbine 196. The EGR circuit 204 may couple to the intake circuit 186 upstream of the compressor 198 and may also couple to the exhaust circuit 28 downstream of the turbine 196. The EGR circuit 320 may couple to the intake circuit 186 upstream of the compressor 198 and may also couple to the exhaust circuit 28 upstream of the turbine 196.

In the illustrated embodiment, the combustion system 10 includes a sensor 256 (e.g., tank level sensor 332) coupled to the condensate tank 322. The sensor 332 (e.g., photo detector, float switches, proximity sensor, camera) may be configured to send a signal to the controller 254 indicative of an amount of condensate in the condensate tank 322. For example, the sensor 332 may be configured to send the signal to the controller 254 based on the condensate in the condensate tank 322 falling below a threshold level (e.g., threshold amount). In certain embodiments, the controller 254 may be configured to control the condensate injection system 12 based on receiving the signal from the sensor 332. For example, the controller 254 may be configured to control the heat exchanger assembly 36, the pump 324, the valve 330, the injector(s) 281, or a combination thereof, based on the signal received from the sensor 332. In certain embodiments, the controller 254 may be configured to decrease a throughput of the pump 324 and/or a parameter associated with the injector(s) 281 (e.g., controlling an amount of condensate injected into the reciprocating engine 18, injection duration) based on the sensor 332 indicating that the amount of condensate in the condensate tank 322 is below a threshold level. For example, the controller 254 may be configured to adjust a ratio of a first duration of time during which the injector(s) 281 inject condensate to a second duration of time during which the injector(s) do not inject condensate.

In certain embodiments, the controller 254 may be configured to control the condensate injection (e.g., via the injector(s) 281) and/or control the heat exchanger assembly 36 to maintain a substantially constant level (e.g., within upper and lower thresholds) of condensate in the condensate tank 322. For example, the controller 254 may be configured to increase a rate of condensate injected into the cylinder via the injector(s) 281 based on an amount of condensate in the condensate tank 322 exceeding a threshold (e.g., high threshold) amount. Additionally or alternatively, the controller 254 may be configured to decrease a rate of condensate injected into the cylinder via the injector(s) 281 based on an amount of condensate in the condensate tank 322 falling below a threshold (e.g., low threshold) amount. In certain embodiments, the controller 254 may be configured to adjust a temperature of the heat exchanger assembly 36 and/or a rate of condensate collection in the condensate tank 322 from the heat exchanger modules 37. In certain embodiments, the controller 254 may be configured to adjust a rate of a drainage of excess condensate to an external drain system. For example, in response to the amount of condensate in the condensate tank 322 exceeding a threshold (e.g., high threshold), the controller 254 may be configured to redirect condensate collected from the heat exchange assembly 36 to the external drain system.

In the illustrated embodiment, the combustion system 10 includes a sensor 256 (e.g., sensor 334) coupled to the exhaust system 22. In certain embodiments, the controller 254 may be configured to determine a temperature of the exhaust gas in the exhaust system 22 based on a signal received from the sensor 334. In certain embodiments, the sensor 334 may include a plurality of sensors disposed in the after-treatment 197 of the exhaust section 194, an inlet of the turbine 196, a cylinder head outlet port of a cylinder 176 of the engine 18, or a combination thereof (see FIG. 1). The control system 254 may be configured to control the condensate injection based on the determined temperature of the exhaust gas in the exhaust system 22. For example, the controller 254 may be configured to decrease an amount of condensate (e.g., via the injector(s) 281) injected into the combustion chamber based on the determined temperature of the exhaust gas falling below a threshold (e.g., low threshold) temperature. Additionally or alternatively, the controller 254 may be configured to increase an amount of condensate (e.g., via the injector(s) 281) injected into the combustion chamber based on the determined temperature of the exhaust gas exceeding a threshold (e.g., high threshold) temperature.

In certain embodiments, the combustion system 10 includes a sensor 256 (e.g., sensor 336) coupled to the combustion system 10 upstream of the turbine 196 proximate to an inlet of the turbine 196. In certain embodiments, the controller 254 may be configured to determine a temperature of the inlet of the turbine 196 based on a signal received from the sensor 336. The control system 254 may be configured to control the condensate injection based on the determined temperature of the inlet of the turbine 196. For example, the controller 254 may be configured to decrease an amount of condensate (e.g., via the injector(s) 281) injected into the combustion chamber based on the determined temperature of the inlet of the turbine 196 falling below a threshold (e.g., low threshold) temperature. Additionally or alternatively, the controller 254 may be configured to increase an amount of condensate (e.g., via the injector(s) 281) injected into the combustion chamber based on the determined temperature of the inlet of the turbine 196 exceeding a threshold (e.g., high threshold) temperature.

In certain embodiments, the combustion system 10 includes one or more sensors 256 (e.g., one or more sensors 338) coupled to one or more cylinders 176 of the engine 18. In certain embodiments, one or more sensors 338 may include one or more port thermocouples. The one or more port thermocouples may be coupled to one or more cylinders 176 of the engine 18 and may be configured to output a signal indicative of a temperature of individual cylinders 176 and/or an average temperature of the cylinders 176. Additionally or alternatively, the one or more sensors 338 may include in-cylinder pressure transducers disposed on one or more of the cylinders 176. The one or more in-cylinder pressure transducers may be configured to output a signal indicative of a pressure of the individual cylinders 176 and/or an average pressure of the cylinders 176. Additionally or alternatively, the one or more sensors 338 may include one or more knock sensors configured to estimate an in-cylinder pressure trace (e.g., pressure reconstruction). The controller 254 may be configured to determine a temperature and/or pressure of one or more cylinders 176 of the engine 18 based on receiving the signal from the one or more sensors 338. The control system 254 may be configured to control the condensate injection based on the determined temperature and/or pressure of the one or more cylinders 176. For example, the controller 254 may be configured to decrease an amount of condensate (e.g., via the injector(s) 281) injected into the combustion chamber based on the determined temperature and/or pressure of the one or more cylinders 176 falling below a threshold (e.g., low threshold) temperature and/or pressure. Additionally or alternatively, the controller 254 may be configured to increase an amount of condensate (e.g., via the injector(s) 281) injected into the combustion chamber based on the determined temperature and/or pressure of the one or more cylinders 176 exceeding a threshold (e.g., high threshold) temperature and/or pressure.

In certain embodiments, the combustion system 10 may include one or more sensors 256 (e.g., one or more sensors 340) disposed between the pump 324 and the engine 18. The one or more sensors 340 may include one or more pressure sensors configured to measure an outlet pressure of the condensate in the fluid circuit 325 prior to injection of the condensate into the engine 18. The controller 254 may be configured to determine a pressure of the condensate disposed between the pump 324 and the engine 18 based on receiving the signal from the one or more sensors 340. The control system 254 may be configured to control the condensate injection based on the determined pressure of the condensate. For example, the controller 254 may be configured to decrease an amount of condensate (e.g., via the injector(s) 281) injected into the combustion chamber based on the determined pressure of the condensate falling below a threshold (e.g., low threshold) pressure. Additionally or alternatively, the controller 254 may be configured to increase an amount of condensate (e.g., via the injector(s) 281) injected into the combustion chamber based on the determined pressure of the condensate exceeding a threshold (e.g., high threshold) pressure.

Figure 4:
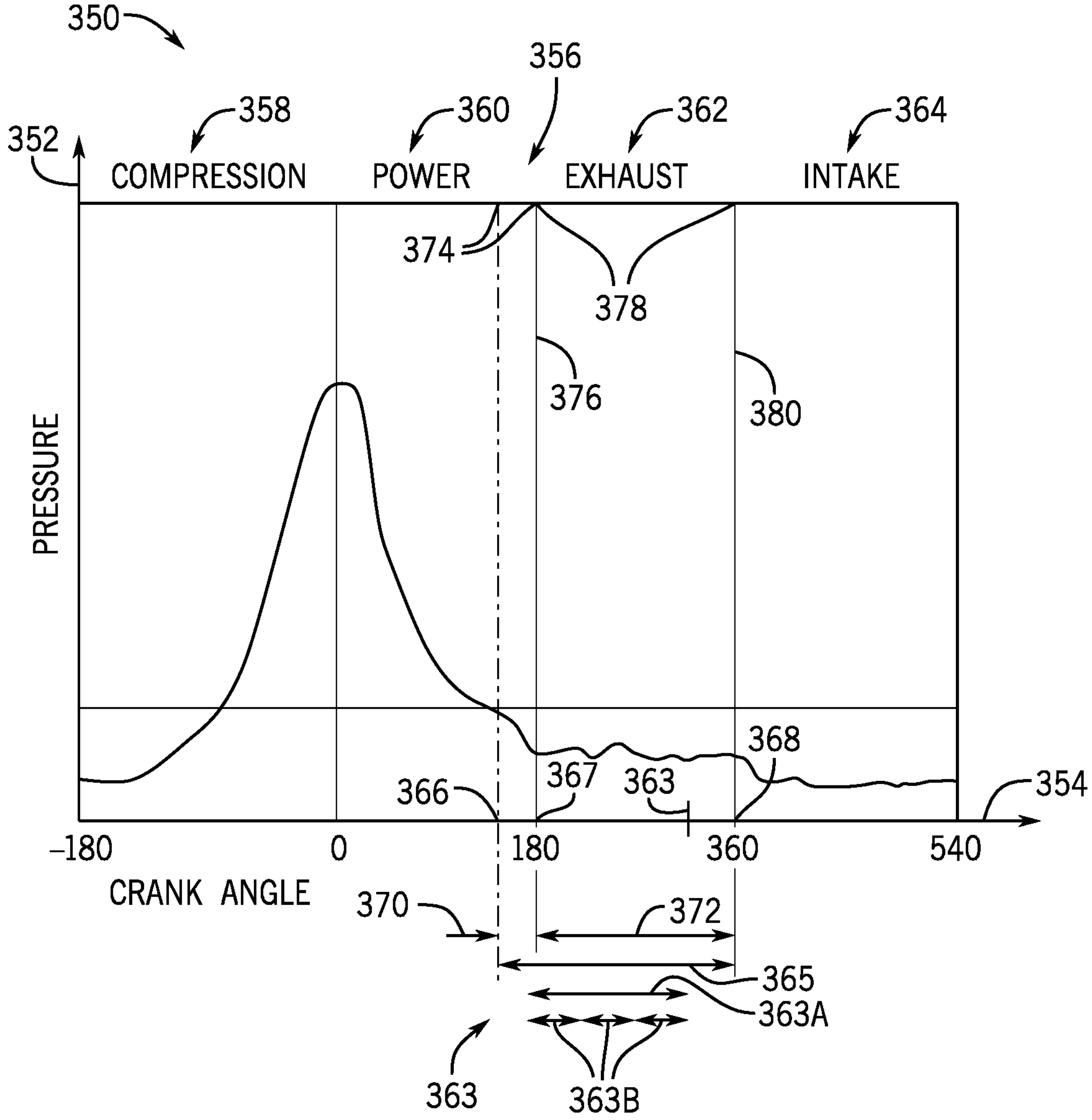
FIG. 4 is an embodiment of a graph mapping an internal pressure and a crank angle during an engine cycle of the piston-cylinder assembly of FIG. 2.

FIG. 4 is an embodiment of a graph 350 mapping an internal pressure 352 and a crank angle 354 of a four-stroke engine cycle 356 of the piston-cylinder assembly 280 of FIG. 2. As shown, the four-stroke engine cycle 356 includes a compression stroke 358 (e.g., compression stage), a power stroke 360 (e.g., power stage, combustion stroke, combustion stage), an exhaust stroke 362 (e.g., exhaust stage), and an intake stroke 364 (e.g., intake stage). The crank angle 354 ranges from −180 degrees (e.g., at a beginning of the compression stroke 358) to 540 degrees (e.g., at an end of the intake stroke 364). As shown, the internal pressure 352 of a cylinder of the reciprocating engine peaks between the end of the compression stroke 358 and the beginning of the power stroke 360. In the illustrated embodiment, the TDCF of the four-stroke cycle is located at 0 crank angle degrees, and the TDCGE (or alternatively, TDCE) of the four-stroke cycle is located at 360 crank angle degrees.

In certain embodiments, the controller 254 may be configured to instruct the condensate injection system 12 to injection condensate at one or more intervals 363 during a portion 365 (e.g., a condensate injection window, boundary, or range) of the four-stroke engine cycle 356 at least partially or entirely during the power stroke 360 and/or the exhaust stroke 362. In certain embodiments, the portion 365 may be described as a maximum acceptable window (e.g., crank angle window) suitable for condensate injection, while the condensate injection at the one or more intervals 363 may occur during all or part of the maximum acceptable window. As shown in the illustrated embodiment, the portion 365 of the four-stroke engine cycle 356 during which the condensate injection system 12 may be configured to inject condensate into the combustion chamber 292 of the piston-cylinder assembly 280 of the reciprocating engine 18 may occur between a first point 366 (e.g., first limit or boundary) and a second point 368 (e.g., second limit or boundary) along the four-stroke engine cycle 356. In the illustrated embodiment, the portion 365 of the four-stroke engine cycle 356 includes portions 370 and 372 of the four-stroke engine cycle 356, wherein the portion 370 occurs during the power stroke 360 and the portion 372 occurs during the exhaust stroke 362. For example, the portion 370 may be an end portion of the power stroke 360 and the portion 372 may be all or part of the exhaust stroke 362. Accordingly, in the illustrated embodiment, the portion 370 extends from the first point 366 during the power stroke 360 to a transition point 367 between the power stroke 360 and the exhaust stroke 362, while the portion 372 extends from the transition point 367 to the second point 368. In certain embodiments, the second point 368 may be a transition point between the exhaust stroke 362 and the intake stroke 364, or the second point 368 may be prior to the transition point during the exhaust stroke 362.

In certain embodiments, the first point 366 may be defined by an offset from an end-of-combustion (EOC) defined by mass fraction burned (MFB) by the Rassweiler and Withrow method. In certain embodiments, the MFB may fall between 0 and 1, and may be described as a Wiebe function curve based on initial pressure and volume (e.g., at ignition), final pressure and volume (e.g., at end of combustion), a polytropic index relating cylinder pressure and volume, and pressure and volume during combustion. In certain embodiments, the EOC is defined as at least 80, 85, 90, or 95 percent of MFB. In certain embodiments, the second point 368 may be during an end portion of the exhaust stroke 362. For example, the second point 368 may occur prior to the opening of an intake valve opening 363 (IVO) of a cylinder of the engine. The IVO may be as early as 30 crank angle degrees before TDCGE (or alternatively, TDCE).

The portion 365 of the four-stroke engine cycle 356 bounded by the first and second points 366 and 368 defines an acceptable condensate injection window, during which the controller 254 can instruct the condensate injection system 12 to inject the condensate for the one or more intervals 363. In certain embodiments, the one or more intervals 363 may include a single interval 363A spanning all or part of the portion 365 or a plurality of intervals 363 (e.g., 2, 3, 4, 5, 6, 7, 8, 9, 10, or more intervals) spanning all or part of the portion 365. The one or more intervals 363 (e.g., 363A and 363B) may start directly at or after the first point 366 during the power stroke 360 or the exhaust stroke 362, and the one or more intervals 363 (e.g., 363A and 363B) may stop directly at or before the second point 368 during the power stroke 360 or the exhaust stroke 362. Furthermore, the controller 254 can instruct the condensate injection system 12 to vary the number and duration of the intervals 363 (e.g., 363A and 363B), the starting point of the intervals 363, the stopping point of the intervals, or any combination thereof, depending on the exhaust gas 30 temperature, the level of available condensate, the exhaust gas emissions, the fuel composition, combustion parameters, or any combination thereof.

In certain embodiments, the portion 370 of the power stroke 360 includes a first crank angle window 374 from the crank angle 354 at the first point 366 before an end 376 of the power stroke 360 (e.g., transition point 367) to the crank angle 354 at the end 376 of the power stroke 360. In certain embodiments, the first crank angle window 374 may be equal to, less than, or greater than at least 5, 10, 15, or 20 degrees. Similarly, the crank angle 354 at the first point 366 may be equal to, less than, or greater than at least 5, 10, 15, or 20 degrees, before the end 376 of the power stroke 360. The portion 372 of the exhaust stroke 362 includes a second crank angle window 378 spanning from the crank angle 354 at the end 376 of the power stroke 360 (e.g., transition point 367) to the crank angle 354 at the second point 368. As discussed above, the crank angle 354 of the second point 368 may be directly at or before an end 380 of the exhaust stroke 362 (e.g., transition point between the exhaust stroke 362 and the intake stroke 364). For example, the crank angle 354 of the second point 368 may be equal to, less than, or greater than at least 5, 10, 15, 20, 30, 40, 50, 60, 70, 80, or 90 degrees before the end 380 of the exhaust stroke 362. Thus, the second crank angle window 378 may be a remaining range of crank angles between the end 376 of the power stroke 360 and the second point 368, such as equal to, less than, or greater than at least 270, 280, 290, 300, 310, 320, 330, 340, 350, or 355 degrees. For example, in certain embodiments, the portion 365 of the four-stroke engine cycle 356 available for condensate injection may include at least 50, 60, 70, 80, 90, 95, 99, or 100 percent of the exhaust stroke 362, and less than 5, 10, 15, 20, 25, 30, 35, 40, 45, or 50 percent of the power stroke 360 (e.g., directly before the end 376 of the power stroke 360). For example, in certain embodiments, the portion 365 of the four-stroke engine cycle 356 available for condensate injection may include approximately 50 to 100, 60 to 100, 70 to 100, 80 to 100, or 90 to 100 percent of the exhaust stroke 362, and 0 to 50, 0 to 40, 0 to 30, 0 to 20, or 0 to 10 percent of the power stroke 360. In certain embodiments, the portion 365 may exclude the intake stroke 364 and the compression stroke 358, such that condensate injection does not occur during the intake stroke 364 and the compression stroke 358. As noted above, first and second crank angle windows 374 and 378 define the portion 365 available for condensate injection in terms of the crank angle 354, wherein the controller 254 is configured to inject condensate into the combustion chamber 292 at one or more intervals 363 during all or part of the first and/or second crank angle windows 374 and 378. Thus the one or more intervals 363 (e.g., 363A and 363B) may be defined based on the crank angle 354. In certain embodiments, the each of the one or more intervals 363 (e.g., 363A and 363B) of condensate injection may occur over a change in crank angles 354 of equal to, less than, or greater than at least 5, 10, 15, 20, 30, 40, 50, 60, 70, 80, 90, 100, 110, 120, 130, 140, 150, 160, 170, 180, 190, or 200 degrees.

The portions 365, 370, and 372 may also be described relative to TDCF and TDCGE. As shown, the first point 366 is disposed between TDCF and a transition point 367 that occurs 180 degrees after aTDCF. In certain embodiments, the first point 366 may have a crank angle 354 equal to, less than, or greater than at least 160, 165, 170, or 175 degrees aTDCF. The portion 372 of the exhaust stroke 362 includes a second crank angle window 378 spanning from the crank angle 354 at the transition point 367 to a second point 368 located at TDCGE (or alternatively, TDCE). In certain embodiments, the second point 368 may be equal to, less than, or greater than at least 5, 10, 15, 20, 30, 40, 50, 60, 70, 80, or 90 degrees before TDCGE (e.g., bTDCGE). Thus, the second crank angle window 378 may be a remaining range of crank angles between the transition point 367 and the second point 368. In certain embodiments, the second point 368 may be located at least 270, 280, 290, 300, 310, 320, 330, 340, 350, or 355 degrees aTDCF. In certain embodiments, the portion 365 may exclude the intake stroke 364 and the compression stroke 358, such that condensate injection does not occur during the intake stroke 364 and the compression stroke 358. That is, the portion 365 may exclude crank angles 354 that occur between 360 degrees and 540 degrees aTDCF, and between TDCF and 180 degrees before TDCF (e.g., bTDCF).

In certain embodiments, the combustion system 10 may include a fuel injection system coupled to the injector 281 or proximate to the injector 281. The controller 254 may be configured to control the fuel injection system to inject a fuel (e.g., hydrocarbon-based fuel, hydrogen, etc.) through the injector 281 into the combustion chamber 292 at a suitable fuel injection timing during an additional portion of the four-stroke engine cycle 356 (e.g., during the intake stroke 364). In certain embodiments, the additional portion of the four-stroke engine cycle 356 during which the fuel is injected into the combustion chamber 292 and the portion 365 of the four-stroke engine cycle 356 during which condensate is injected into the combustion chamber 292 are different from one another. In certain embodiments, the controller 254 is configured to control the condensate injection system 12 to inject the condensate to quench post-combustion reactions and reduce undesirable emissions (e.g., CO, NOx, SOx, etc.). Methods for determining the time at which the condensate is injected into the combustion chamber 292 is described in more detail herein.

Figure 5:
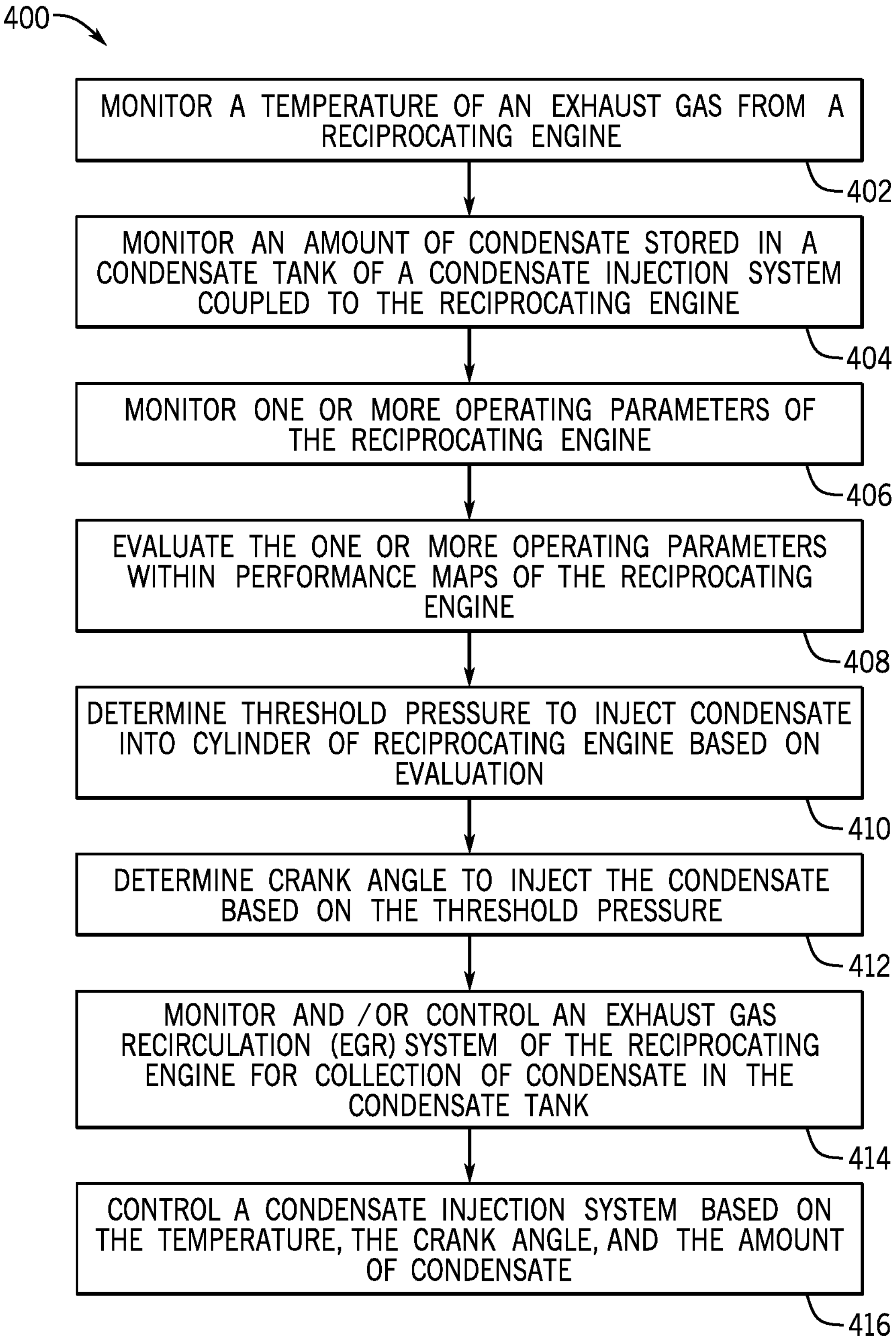
FIG. 5 is a flow chart showing an embodiment of a process for controlling the condensate injection system of FIG. 2.

FIG. 5 is a flow chart showing an embodiment of a process 400 for controlling the condensate injection system 12 of FIG. 2. In block 402 of the process 400, the controller 254 may be configured to monitor a temperature of an exhaust gas from a reciprocating engine. For example, the controller 254 may be configured to receive a signal (e.g., feedback) from a sensor (e.g., thermocouple, resistance temperature detector [RTD], etc.) configured to provide a signal indicative of a temperature of exhaust gas in the exhaust system of the combustion system. Additionally, the controller 254 may be configured to determine if the monitored exhaust gas temperature decreases below a low threshold temperature and/or increases above a high threshold temperature.

In block 404, the controller 254 may be configured to monitor an amount of condensate stored in the condensate tank of the condensate injection system coupled to the reciprocating engine. For example, the controller 254 may be configured to receive a signal (e.g., feedback) from a sensor (e.g., resistive/float fuel sensor, capacitive fuel sensor, etc.) configured to determine an amount (e.g., level) of condensate stored in the condensate tank. Additionally, the controller 254 may be configured to determine if the condensate in the condensate tank decreases below a low threshold amount. Additionally or alternatively, the controller 254 may be configured to determine if the condensate in the condensate tank increases above a high threshold amount of condensate.

In block 406, the controller 254 may be configured to monitor one or more operating parameters of the reciprocating engine. For example, a position sensor (e.g., magnetic pickup or hall-effect) may be coupled to the crankshaft of the reciprocating engine and configured to send a signal (e.g., feedback) indicative of a crank angle to the controller 254. In response to receiving the signal, the controller 254 may be configured to determine a crank angle of the crankshaft of the reciprocating engine.

In block 408, the controller 254 may be configured to evaluate the one or more parameters within performance maps (e.g., lookup tables) associated with the reciprocating engine. For example, the controller 254 may be configured to utilize the performance maps in conjunction with one or more known parameters (e.g., fuel index, intake manifold absolute pressure, engine speed, ignition timing, etc.) to provide parameters that are not directly measured (e.g., internal pressure of combustion chamber). In certain embodiments, performance maps may be utilized for standard and non-standard conditions (e.g., less than commercial quality natural gas, less than full engine speed, etc.). For example, non-standard conditions may be approximated by using a corresponding offset from the standard condition.

In block 410, the controller 254 may be configured to determine a threshold pressure to inject condensate into a cylinder of the reciprocating engine based on the evaluation of the one or more parameters. For example, the controller 254 may be configured to determine the threshold pressure by setting the threshold pressure to be lower than the pressure at which the condensate is injected into the combustion chamber of the cylinder.

In block 412, the controller 254 may be configured to determine a crank angle to inject the condensate based on the threshold pressure. For example, the controller 254 may be configured to use a graph similar to the graph 350 shown in FIG. 4 mapping internal pressure of the combustion chamber to the crank angle of the crank shaft. For example, the controller 254 may be configured to determine the starting point of the portion of the engine cycle during which condensate is injected into the combustion chamber based on the determined threshold internal pressure of the combustion chamber.

In block 414, the controller 254 may be configured to monitor and/or control the heat exchanger assembly (e.g., EGR cooler system) of the reciprocating engine for collection of condensate in the condensate tank. In certain embodiments, the controller 254 may be configured to adjust the amount of condensate produced by the heat exchanger assembly such that the amount of condensate stored in the condensate tank remains between a low threshold amount and a high threshold amount. For example, the controller 254 may be configured to increase the temperature of the heat exchanger assembly (e.g., decrease condensate production) based on the amount of condensate in the condensate tank exceeding a high threshold. Additionally or alternatively, the controller 254 may be configured to decrease the temperature of the heat exchanger assembly (e.g., increase condensate production) based on the amount of condensate in the condensate tank falling below a low threshold. In certain embodiments, the controller 254 may be configured to control the amount of condensate produced by the heat exchanger assembly via controlling a temperature of the heat exchanger assembly.

In block 416, the controller 254 may be configured to control the condensate injection system based on the monitored temperature, the crank angle, and the amount of condensate in the condensate tank. For example, the controller 254 may be configured to control a flow rate, a pressure, an injector configuration, or a combination thereof based on the monitored exhaust gas temperature, the crank angle of the crankshaft, the amount of condensate in the condensate tank, or any combination thereof.

Technical effects of the disclosed embodiments include using condensate (e.g., water) collected from the EGR system to regulate the temperature of the cylinder head exhaust port and/or turbine inlet temperature associated with combustion. For example, a controller may be configured to monitor a temperature of an exhaust gas disposed in an exhaust system of the combustion system. If the temperature of the exhaust gas decreases below a lower temperature threshold or increases above a higher temperature threshold, then the controller may be configured to decrease or increase the amount of condensate (e.g., collected from the EGR) into the combustion chamber, respectively. By controlling the amount of condensate injected into the combustion cylinder based on the exhaust temperature, the controller may be configured to regulate the temperature of the exhaust gas between the lower and higher temperature thresholds. Additionally, injecting condensate adds exhaust mass flow to the turbine.

The subject matter described in detail above may be defined by one or more clauses, as set forth below.

A system includes a condensate injection system configured to fluidly couple to a combustion chamber of a reciprocating engine and an exhaust gas recirculation (EGR) system of the reciprocating engine. The condensate injection system includes a condensate tank configured to store condensate collected from the EGR system. The condensate injection system also includes a pump fluidly coupled to the condensate tank. The condensate injection system also includes an injector fluidly coupled to the pump. The injector is configured to inject condensate into the combustion chamber during a first portion of an engine cycle of the reciprocating engine. The first portion of the engine cycle includes at least part of a power stroke and/or an exhaust stroke of the engine cycle.

The system of the preceding clause, including the reciprocating engine, wherein the engine cycle includes a four-stroke engine cycle comprising an intake stroke, a compression stroke, the power stroke, and the exhaust stroke.

The system any preceding clause, including the EGR system coupled to the reciprocating engine.

The system of any preceding clause, wherein the EGR system includes an exhaust cooling system having a plurality of EGR coolers configured to cool an exhaust gas being recirculated from an exhaust manifold to an intake manifold of the reciprocating engine, wherein a condensate drain conduit is coupled to the exhaust cooling system and the condensate tank.

The system of any preceding clause, including a controller having a processor, a memory, and instructions stored on the memory and executable by the processor to control the condensate injection system to inject the condensate through the injector into the combustion chamber during the first portion of the engine cycle.

The system of the preceding clause, wherein the condensate injection system comprises includes a condensate treatment system including a reverse osmosis system, a deionized system, a distilled water system, a pH balancing system, or a combination thereof; a check valve disposed between the injector and the pump; a pressure relief valve; or a combination thereof.

The system of any preceding clause, including one or more sensors configured to obtain feedback associated with one or more parameters of an exhaust gas, wherein the controller is configured to control the condensate injection system to inject the condensate in response to the feedback.

The system of any preceding clause, including a fuel injection system coupled to the injector, wherein the controller is configured to control the fuel injection system to inject a fuel through the injector into the combustion chamber during a second portion of the engine cycle, and the first and second portions of the engine cycle are different from one another.

The system of any preceding clause, wherein the first portion of the engine cycle excludes an intake stage and a compression stage.

The system of any preceding clause, wherein the injector is configured to inject the condensate into the combustion chamber at one or more intervals during all or part of the first portion of the engine cycle, wherein the first portion includes an end portion of the power stroke and all or part of the exhaust stroke between first and second points along the engine cycle.

The system of any preceding clause, wherein the first portion includes a crank angle window, the end portion includes a first crank angle window from a first crank angle at least 20 degrees before a first end of the power stroke to a second crank angle at the first end of the power stroke, and the second end portion includes a second crank angle window from a third crank angle at the first end of the power stroke to a fourth crank angle at or before a second end of the exhaust stroke.

A system includes a controller having a processor, a memory, and instructions stored on the memory and executable by the processor to control a condensate injection system configured to fluidly couple to a combustion chamber of a reciprocating engine and an exhaust gas recirculation (EGR) system of the reciprocating engine. The condensate injection system includes a condensate tank configured to store condensate collected from the EGR system, a pump fluidly coupled to the condensate tank, and an injector fluidly coupled to the pump. The controller is configured to control the injector to inject condensate into the combustion chamber during a first portion of an engine cycle of the reciprocating engine. The first portion of the engine cycle includes at least part of a power stroke and/or an exhaust stroke of the engine cycle.

The system of the preceding clause, wherein the controller is configured to obtain first feedback from a first sensor indicative of a temperature of an exhaust gas disposed in an exhaust system of the reciprocating engine. The controller is also configured to control the condensate injection system based on the first feedback.

The system of any preceding clause, wherein controlling the condensate injection system includes decreasing an amount of the condensate injected into the combustion chamber based on the temperature of the exhaust gas falling below a low threshold temperature, increasing the amount of the condensate based on the temperature exceeding a high threshold temperature, or any combination thereof.

The system of any preceding clause, wherein the controller is configured to obtain second feedback from a second sensor indicative of an amount of the condensate in the condensate tank. The controller is also configured to obtain third feedback from a third sensor indicative of one or more operating parameters of the reciprocating engine. The controller is also configured to control the condensate injection system based on the first feedback, the second feedback, or any combination thereof.

A method includes controlling, via a controller, a condensate injection system configured to fluidly couple to a combustion chamber of a reciprocating engine and an exhaust gas recirculation (EGR) system of the reciprocating engine. The condensate injection system includes a condensate tank configured to store a condensate collected from the EGR system, a pump fluidly coupled to the condensate tank, and an injector fluidly coupled to the pump. Controlling includes controlling the injector to inject the condensate into the combustion chamber during a first portion of an engine cycle of the reciprocating engine. The first portion of the engine cycle includes at least part of a power stroke and/or an exhaust stroke of the engine cycle.

The method of the preceding clause, wherein controlling the condensate injection system includes monitoring a temperature of an exhaust gas from the reciprocating engine. Controlling the condensate injection system also includes monitoring an amount of the condensate stored in the condensate tank of the condensate injection system.

The method of any preceding clause, wherein controlling the condensate injection system includes evaluating the one or more operating parameters within performance maps of the reciprocating engine, determining a threshold pressure to inject the condensate into a cylinder of the reciprocating engine based on evaluation of the one or more operating parameters, and determining a crank angle to inject the condensate based on the threshold pressure.

The method of any preceding clause, wherein controlling the condensate injection system includes monitoring the EGR system of the reciprocating engine for a collection of the condensate in the condensate tank, controlling the EGR system of the reciprocating engine for the collection of the condensate in the condensate tank, or a combination thereof.

The method of any preceding clause, wherein controlling the condensate injection system includes obtaining feedback from a sensor indicative of the amount of the condensate in the condensate tank, and controlling the amount of the condensate in the condensate tank based on the feedback.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112 (f).

The invention claimed is:

1. A system, comprising:

a condensate injection system configured to fluidly couple to a combustion chamber of a reciprocating engine and an exhaust gas recirculation (EGR) system of the reciprocating engine, wherein the condensate injection system comprises:

a condensate tank configured to store condensate collected from the EGR system;

a pump fluidly coupled to the condensate tank; and an injector fluidly coupled to the pump, wherein the injector is configured to inject condensate into the combustion chamber at one or more intervals during all or a part of a first portion of an engine cycle of the reciprocating engine, and the first portion of the engine cycle includes:

at least an end portion of a power stroke, comprising a first crank angle window from a first crank angle at least 20 degrees before a first end of the power stroke to a second crank angle at the first end of the power stroke; and all or part of an exhaust stroke of the engine cycle, comprising a second crank angle window from a third crank angle at the first end of the power stroke to a fourth crank angle at or before a second end of the exhaust stroke.

2. The system of claim 1, comprising the reciprocating engine, wherein the engine cycle comprises a four-stroke engine cycle comprising an intake stroke, a compression stroke, the power stroke, and the exhaust stroke.

3. The system of claim 2, comprising the EGR system coupled to the reciprocating engine.

4. The system of claim 1, wherein the EGR system comprises an exhaust cooling system having a plurality of EGR coolers configured to cool an exhaust gas being recirculated from an exhaust manifold to an intake manifold of the reciprocating engine, wherein a condensate drain conduit is coupled to the exhaust cooling system and the condensate tank.

5. The system of claim 1, comprising a controller having a processor, a memory, and instructions stored on the memory and executable by the processor to control the condensate injection system to inject the condensate through the injector into the combustion chamber during the first portion of the engine cycle.

6. The system of claim 5, wherein the condensate injection system comprises:

a condensate treatment system comprising a reverse osmosis system, a deionized system, a distilled water system, a pH balancing system, or a combination thereof;

a check valve disposed between the injector and the pump;

a pressure relief valve;

or a combination thereof.

7. The system of claim 6, comprising one or more sensors configured to obtain feedback associated with one or more parameters of an exhaust gas, wherein the controller is configured to control the condensate injection system to inject the condensate in response to the feedback.

8. The system of claim 5, comprising a fuel injection system coupled to the injector, wherein the controller is configured to control the fuel injection system to inject a fuel through the injector into the combustion chamber during a second portion of the engine cycle, and the first and second portions of the engine cycle are different from one another.

9. The system of claim 1, wherein the first portion of the engine cycle excludes an intake stroke and a compression stroke.

10. The system of claim 1, wherein the first portion extends at least across a transition between the power stroke and the exhaust stroke.

11. The system of claim 1, wherein the one or more intervals occur over a change in crank angle that is less than 30 degrees.

12. A system, comprising:
- a controller having a processor, a memory, and instructions stored on the memory and executable by the processor to control a condensate injection system configured to fluidly couple to a combustion chamber of a reciprocating engine and an exhaust gas recirculation (EGR) system of the reciprocating engine, wherein the condensate injection system comprises a condensate tank configured to store condensate collected from the EGR system, a pump fluidly coupled to the condensate tank, and an injector fluidly coupled to the pump, wherein the controller is configured to:
  - control the injector to inject condensate into the combustion chamber at one or more intervals during all or part of a first portion of an engine cycle of the reciprocating engine, wherein the first portion of the engine cycle includes:
    - at least an end portion of a power stroke, comprising a first crank angle window from a first crank angle at least 20 degrees before a first end of the power stroke to a second crank angle at the first end of the power stroke; and
    - all or part of an exhaust stroke of the engine cycle, comprising a second crank angle window from a third crank angle at the first end of the power stroke to a fourth crank angle at or before a second end of the exhaust stroke.

13. The system of claim 12, wherein the controller is configured to:
- obtain first feedback from a first sensor indicative of a temperature of an exhaust gas disposed in an exhaust system of the reciprocating engine; and
- control the condensate injection system based on the first feedback;
- wherein the first feedback is indicative of the temperature of the exhaust gas at a cylinder head port of the reciprocating engine, an inlet of a turbine of the reciprocating engine, or an after-treatment system of the reciprocating engine.

14. The system of claim 13, wherein controlling the condensate injection system comprises:
- decreasing an amount of the condensate injected into the combustion chamber based on the temperature of the exhaust gas falling below a low threshold temperature;
- increasing the amount of the condensate based on the temperature exceeding a high threshold temperature; or
- any combination thereof.

15. The system of claim 13, wherein the controller is configured to:
- obtain second feedback from a second sensor indicative of an amount of the condensate in the condensate tank;
- obtain third feedback from a third sensor indicative of one or more operating parameters of the reciprocating engine; and
- control the condensate injection system based on the first feedback, the second feedback, or any combination thereof.

16. A method, comprising:
- controlling, via a controller, a condensate injection system configured to fluidly couple to a combustion chamber of a reciprocating engine and an exhaust gas recirculation (EGR) system of the reciprocating engine, wherein the condensate injection system comprises a condensate tank configured to store a condensate collected from the EGR system, a pump fluidly coupled to the condensate tank, and an injector fluidly coupled to the pump, wherein controlling comprises:
- controlling the injector to inject the condensate into the combustion chamber at one or more intervals during all or part of a first portion of an engine cycle of the reciprocating engine, wherein the first portion of the engine cycle includes:
  - at least an end portion of a power stroke, comprising a first crank angle window from a first crank angle at least 20 degrees before a first end of the power stroke to a second crank angle at the first end of the power stroke; and
  - all or part of an exhaust stroke of the engine cycle, comprising a second crank angle window from a third crank angle at the first end of the power stroke to a fourth crank angle at or before a second end of the exhaust stroke.

17. The method of claim 16, wherein controlling the condensate injection system comprises:
- monitoring a temperature of an exhaust gas from the reciprocating engine; and
- monitoring an amount of the condensate stored in the condensate tank of the condensate injection system.

18. The method of claim 17, wherein controlling the condensate injection system comprises:
- receiving feedback from a sensor indicative of one or more operating parameters of the reciprocating engine;
- evaluating the one or more operating parameters within performance maps of the reciprocating engine;
- determining a threshold pressure to inject the condensate into a cylinder of the reciprocating engine based on evaluation of the one or more operating parameters; and
- determining a crank angle to inject the condensate based on the threshold pressure.

19. The method of claim 18, wherein controlling the condensate injection system comprises:
- monitoring the EGR system of the reciprocating engine for a collection of the condensate in the condensate tank;
- controlling the EGR system of the reciprocating engine for the collection of the condensate in the condensate tank;
- or a combination thereof.

20. The method of claim 19, wherein controlling the condensate injection system comprises:
- obtaining feedback from a sensor indicative of the amount of the condensate in the condensate tank; and
- controlling the amount of the condensate in the condensate tank based on the feedback.

* * * * *